Figure 1:
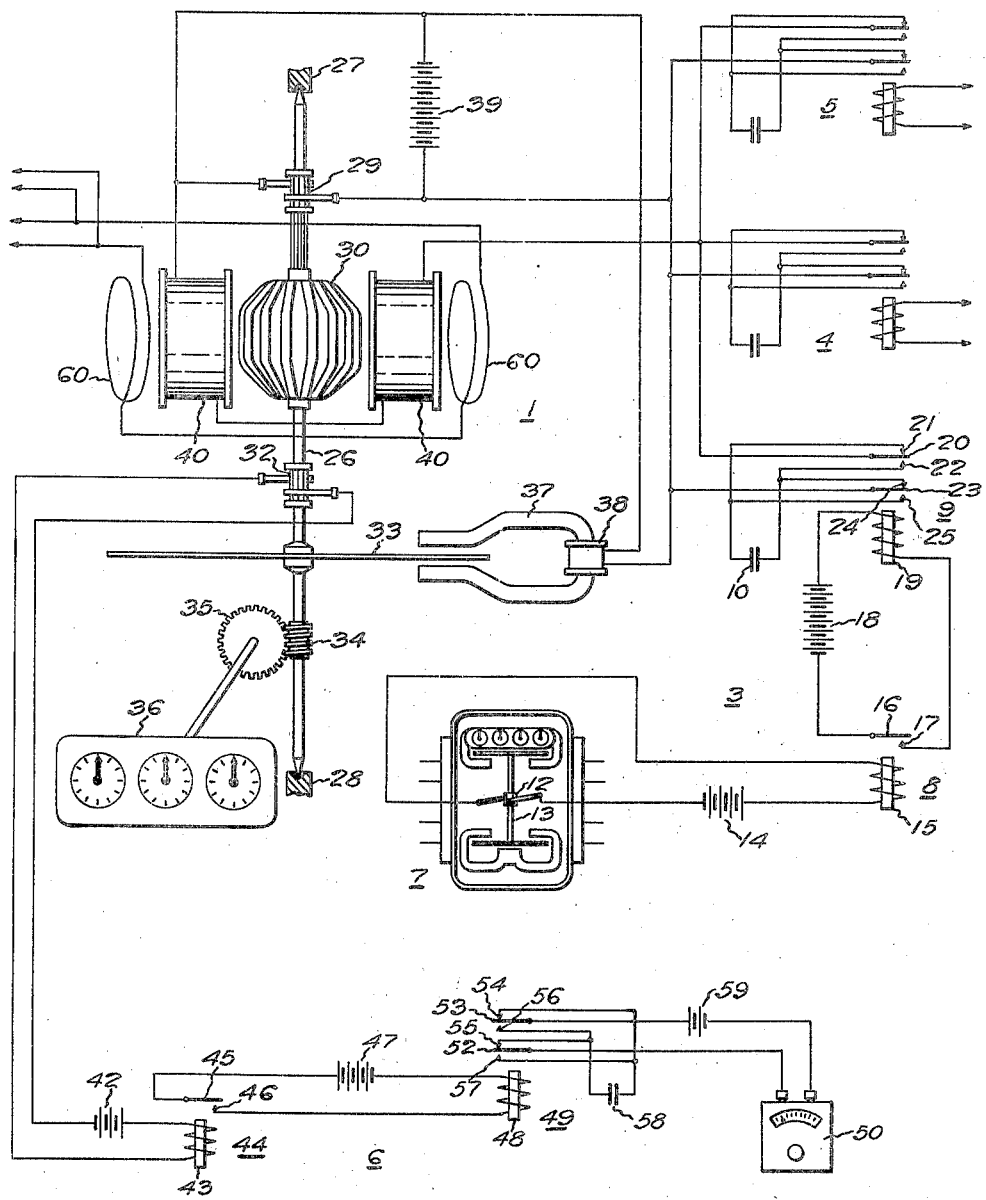

April 2, 1929.  G. G. WAITE  1,707,291
REMOTE METERING DEVICE
Filed April 29, 1927  2 Sheets-Sheet 1

WITNESSES:
J. S. Neilson
B. R. King

INVENTOR
Griffin G. Waite
BY
Wesley G. Carr
ATTORNEY

April 2, 1929.  G. G. WAITE  1,707,291
REMOTE METERING DEVICE
Filed April 29, 1927   2 Sheets-Sheet 2

WITNESSES:

INVENTOR
Griffin G. Waite
ATTORNEY

Patented Apr. 2, 1929.

1,707,291

UNITED STATES PATENT OFFICE.

GRIFFIN G. WAITE, OF WILKINSBURG, PENNSYLVANIA, ASSIGNOR TO WESTINGHOUSE ELECTRIC & MANUFACTURING COMPANY, A CORPORATION OF PENNSYLVANIA.

REMOTE METERING DEVICE.

Application filed April 29, 1927. Serial No. 187,650.

My invention relates to remote-metering equipment and more particularly to the class using the impulse method for transmitting meter readings.

An object of my invention is to provide means for indicating the total amount of energy traversing a number of remotely located electrical power circuits.

Another object of my invention is to provide means for indicating an electrical quantity traversing a plurality of proximately or remotely located and connected or unconnected electrical circuits.

Another object of my invention is to provide means for automatically totalizing the electrical impulses traversing a plurality of meter circuits.

Another object of my invention is to provide means for causing an electric-impulse-totalizing motor meter to operate substantially unaffected by variations in the voltage of the actuating impulses.

Another object of my invention is to provide means for accurately and automatically integrating the sum of electrical impulses traversing a plurality of electrical circuits.

Another object of my invention is to provide means for totalizing electrical quantities from a plurality of remote current-balance transmitters.

Another object of my invention is to provide means for totalizing and integrating the electrical impulses and quantities from both remote current-balance transmitters and remote impulse transmitters at one and the same time.

A further object of my invention is to provide an electric-impulse-totalizing device that shall be relatively cheap to manufacture and efficient in operation.

A desirable method of remote metering is effected by what is called the impulse system. The impulse system of transmitting meter readings consists of generating electrical impulses in an electrical circuit at a rate proportional to a quantity being measured by a meter located at a distant point and causing such electrical impulses to operate a receiving device, such as a notching relay.

The impulse system of remote metering possesses distinctive advantages that render it superior to other systems. This system lends itself readily to remote metering over unlimited distances. Readings may be transmitted as far as one hundred miles with substantially no difficulty. The impulses pass through insulating transformers and repeating coils efficiently, thus providing a flexibility of application that makes this method applicable to a variety of line conditions and line requirements.

In addition to the above mentioned features, the impulse method of transmitting meter readings is accurate, relatively cheap and very simple. The impulses may be transmitted free of inaccuracies arising from line-leakage or line-resistance variations. The system may be made to utilize existing telephone lines, without interfering with the normal operation of the latter. A variety of readings may be obtained on the receiving end of the circuit, such as indicated, integrated and recorded readings. Also readings showing power or synchronized demand may be obtained.

Apparatus used in the impulse system of remote metering are grouped broadly into two main classes, namely, that class operating on a high impulse rate and that class operating on a low-impulse rate.

The system having a high impulse rate is used for obtaining indicated readings for load dispatching in connection with supervisory control for automatic substations. This system is also used to obtain integrated readings, or to operate a master demand meter in conjunction with an indicator system.

The system having a low impulse rate is especially adapted to the operation of demand meters and integrating meters where accuracy is required for such purposes as billing. The low impulse rate system is applicable to a method of totalizing the readings of a large number of meters on one master meter, regardless of the location of the individual meters with respect to each other. Such a method is desirable where a number of electrical feeders lead to a particular customer and an indication of the synchronous energy demand to that customer is required.

Impulses may be generated in a remote meter circuit by means of a contact-making watthour meter or other rotating-element meter. One method of accomplishing this result consists of placing a standard polyphase watthour meter having special contacts in electrical circuit relation with a source of current. A contact gear mechanism in the gear train permits the source of current to send electrical impulses through the circuit. The impulses are made at a low rate so that the normal accuracy of the meter is not diminished. The frequency of the impulses is proportional to the energy passing through the meter.

A different form of impulse sender employs a contacting commutator mounted on the shaft of a watthour meter. Such senders cause impulses to be sent at a high rate. A high rate of impulses is required in order to obtain a satisfactory indication or operation with indicating or recording receivers. The performance of integrating or demand-measuring receivers is entirely independent of the impulse rate. Therefore, that class of senders using contacts in the gear train insure a high degree of accuracy even at light loads, since the gear train turns slower than the shaft carrying the motor element. The integrating dials of the receiving meters show, for example, the true kilowatt hour consumption.

Another method of remote metering consists in sending current proportional to the quantity being measured by what is termed current-balance transmitters. Remote-indicating apparatus of the current-balance type is used for the totalization or remote transmission of readings of voltages, current, power, water level position, etc. Without going into a detailed description of the operation of current-balance transmitters, it is sufficient to state here, for purposes of clearness and in connection with my invention, only, that a variation in the quantity measured is made to cause a corresponding variation in the quantity of current traversing a remote-metering circuit.

It is sometimes useful and desirable to totalize both impulse circuits and current-balance circuits at the same time.

My invention is equally applicable to the integrating and totalizing of remote-metering circuits operating under the impulse system, or the current-balance system, or a combination of both the impulse and the current-balance systems.

In addition to the above useful applications of my invention, several novel features are incorporated therein for causing the device to operate accurately and efficiently. One important feature is a means for substantially eliminating errors caused by variations in voltage.

In practicing my invention, I provide a motor meter that is adapted to rotate at a speed that is proportional to the total number of electrical impulses or electrical quantity or both traversing a plurality of electrical remote meter circuits. Also, I provide means in the braking portion of the meter for preventing errors incident to variations in voltage of the supply circuit.

Figure 2:
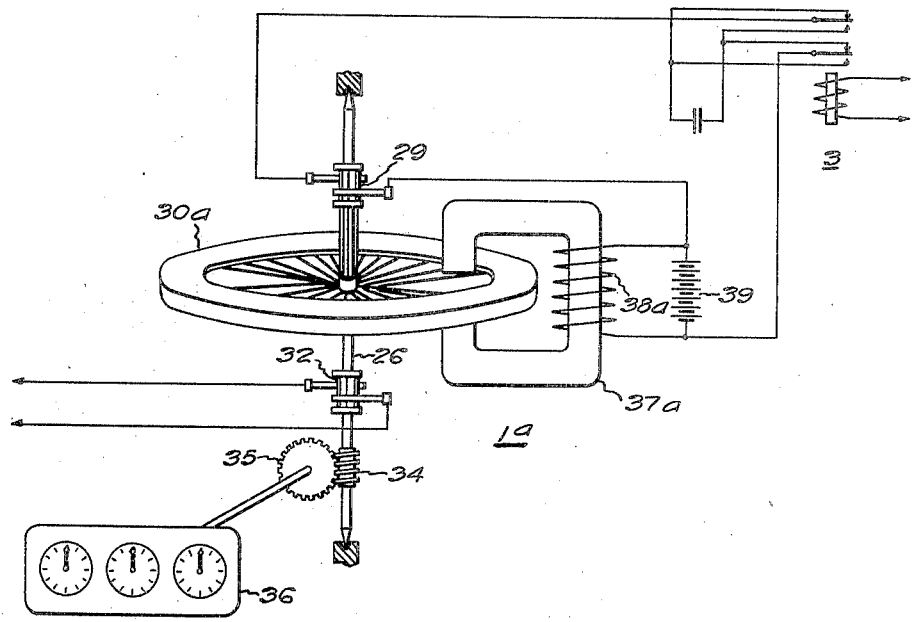
Figure 3:
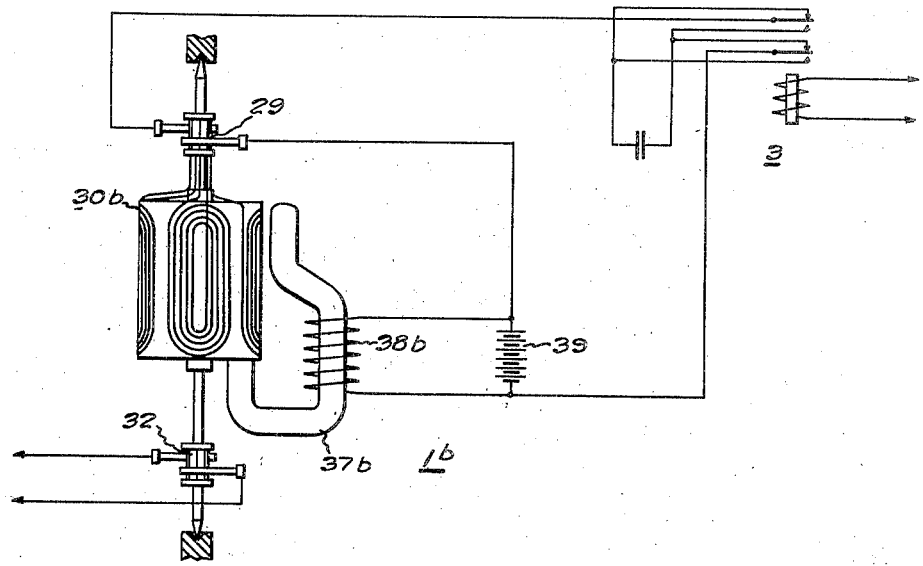

My invention may be more readily comprehended by reference to the accompanying drawing, in which Figure 1 is a view, partly elevational and partly diagrammatic, of a remote metering system, Fig. 2 is a view, similar to Fig. 1, of a modification, and Fig. 3 is a view, similar to Fig. 1, of another modification.

In Fig. 1, an impulse-totalizing device 1 is electrically associated with remote meter circuits 3, 4 and 5. An indicating or recording meter circuit 6 is adapted to show the operation of the totalizing device 1 at some remote point or in the same region as the totalizing device 1.

The remote meter circuits 3, 4 and 5, in the example shown, comprise, severally, a meter 7 adapted to rotate in acordance with a characteristic of some quantity, as the magnitude of the electrical power traversing a circuit, a relay 8, a relay 9, and a condenser 10. The meter 7 is provided with a contact-making device 12 mounted on a shaft 13. A source of current, such as a battery 14, is placed in series-circuit relation with the contact making device 12 and the winding of an electromagnet 15 of the relay 8. As the shaft 13 rotates, the contacting device 12 causes electrical impulses to be sent from the battery 14 through the electromagnet 15.

The relay 8 is provided with a contact-making armature 16 that is normally biased away from a contact 17. In series-circuit relation with the armature 16 and the contact 17 is a battery 18 and the winding of an electromagnet 19 of the relay 9.

The relay 8 and the relay 9 may be remotely located with respect to each other, since the two are adapted to operate concurrently. The relay 9 operates every time the contacting device 12 closes its series circuit.

The relay 9 is provided with an armature 20 that is operated by the electromagnet 19 to cease touching a contact 21 and to touch a contact 22; and an armature 23 that is operated by the electromagnet 19 to cease touching a contact 24 and to touch a contact 25. The armatures 20 and 23 operate simultaneously.

The totalizing motor meter 1 comprises a shaft 26 mounted to rotate between jewelled bearings 27 and 28, in a well-known manner. Mounted on the shaft 26, is a commutator member 29, a wound rotor 30, a contactor 32, a disc 33 and a worm gear 34. The worm gear 34 meshes with a worm wheel 35 to operate an indicating register 36 of a well-known type.

The disc 33 is mounted to rotate between the projections of an electromagnet 37. The electromagnet 37 is provided with a winding 38 that is energized by a source of electrical voltage, indicated as a battery 39.

The rotor winding 30 is energized by the battery 39 through the commutator member 29 and the cooperating brushes. The motor meter 1 has a stator winding 40 so disposed adjacent to the rotor winding 30 that electrical impulses traversing it will cause rotation of the shaft 26. The stator winding 40 is in series-circuit relation with the battery 39 and the condenser 10, through the armatures and contacts of the relay 9. The latter are adapted to reverse the polarity of the condenser 10 with respect to the battery 39, so that impulses of a definite amount of energy traverse the stator winding 40.

Normally, the armatures 20 and 23 and the contacts 21 and 24, respectively, put the condenser 10 in a position to be charged. The electromagnet 19 operates to reverse the polarity of the condenser 10 with respect to the battery 39 by opening the upper contacts and closing the lower contacts. The condenser 10 having been charged, this operation places the positively charged side of the condenser in series-circuit relation with the negative side of the battery 39. Such a re-arrangement of the condenser with respect to the battery causes a rapid discharge of the former, with a subsequent recharge in the opposite direction. Upon a release of the armatures 20 and 23 by the electromagnet 19, a similar action takes place. Thus, every time the armatures 20 and 23 move, whether in an upward or in a downward direction, the condenser 10 is reversed in circuit relation to cause a discharge and a recharge from the battery 39.

The circuits 4 and 5 are similar in construction and operation to the circuit 3. The condensers in those circuits, corresponding to the condenser 10 in circuit 3, should properly be of substantially the same capacity for impulses of the same denomination, since they are in parallel-circuit relation to each other.

The contact-making device 32 is in series-circuit relation with a battery 42 and the winding of an electromagnet 43 of a relay 44. The contact-making device 32, upon rotation of the shaft 26, is adapted to make and break this series circuit in accordance with the speed of rotation of the shaft 26. The relay 44 is provided with an armature 45 that is actuated to touch a contact 46 when current flows through the winding of electromagnet 43. In series-circuit relation with the armature 45 and the contact 46 is a source of current, such as a battery 47 and the winding of an electromagnet 48 of a relay 49. The armature 45 is normally biased away from the contact 46 so that the battery 47 is discharged only during a useful operation.

The relay 49 is adapted to operate an indicating impulse receiver 50 that is calibrated to show the total number of impulses traversing the circuits 3, 4 and 5. The relay 49 is similar in construction and operation to the relay 9. Relay 49 is provided with two armatures 52 and 53 that are normally biased upwardly to touch contacts 55 and 54, respectively. When the electromagnet 48 is energized, the armatures cease to make contact with contacts 54 and 55 and touch lower contacts 57 and 56, respectively. A condenser 58 is in such electric-circuit relation to the instrument 50, a battery 59 and contacts of the relay 49 that the condenser 58 is reversed in polarity with respect to the battery 59 upon operation of the armatures of the relay 49, in a manner similar to the operation of the relay 9, as hereinbefore explained.

The relays and devices may be located in various distant places with respect to each other without affecting their operation or the operation of the system. However, a convenient and desirable distribution of the apparatus is as follows. Since the measuring instruments or watthour meters that perform the function of senders are located in near or distant substations, the battery 14 and the relay 8 may be mounted on the same instrument board. The impulse-totalizing meter 1 and the relays 3, 4 and 5 are located at any convenient point remote therefrom. The instrument 50 is in the load dispatcher's office. This office could be remote with respect to any of the stations or in one of them.

The impulse-totalizing motor meter of the style shown in Fig. 1 is adapted to compensate for variations in the voltage of a source of supply. Any change in voltage of the battery 39 or other source of energy changes the motivating fluxes of both the rotor winding 30 and the stator winding 40 and would affect the accuracy of the device, (assuming constant load) approximately as the square of the change in voltage. But such voltage error is compensated for by making the damping magnet "iron out" the change, by increasing or decreasing the damping torque in the same ratio that the driving torque is increased or decreased.

The damping is effected by the electromagnet 37 that is energized by the winding 38 from the same source of voltage that the driving windings are energized. Any change in the voltage of the winding 38 changes the damping on the disc 33 approximately as the square of the change in voltage. In this manner any tendency for variations in voltage to affect the driving forces are compensated for by a corresponding negative effect in the damping forces. Thus the motor meter operates substantially free of voltage variations.

In Figs. 2 and 3, the same effect is obtained by combining the damping electromagnet and the stator winding.

In Fig. 2, an impulse-totalizing motor meter 1ª comprises a disc armature 30ª mounted on a shaft 26. The inner portion of the armature 30ª is provided with a pancake rotor winding that is electrically connected to a commutator member 29. The rotor winding of the armature 30ª is in electrical circuit relation with a battery 39 and an impulse relay 3. The impulse relay 3 is operated from a remote sending meter, as hereinbefore explained. An electromagnet 37ª is disposed adjacent the armature 30ª, and is provided with a winding 38ª that is energized by the battery 39.

A contact-making device 32 leads to an impulse-indicating instrument (not shown). The rotations of the shaft 26 are indicated by a registering device 36 that is mechanically connected to the shaft 26 through a worm gear 34 mounted thereon and a worm wheel 35.

The electro-magnet 37ª performs the dual functions of a damping magnet and a stator member of the instrument 1ª. Variations in the voltage of the battery 39 do not affect the accuracy of the motor meter because variations in the driving fluxes are counterbalanced by opposite correcting variations in the damping fluxes.

The motor meter may be modified as shown in Fig. 3. Instead of being in the form of a disc, the armature of the meter 1ᵇ may be in the form of a cylinder 30ᵇ having an electromagnet 37ᵇ modified to conform thereto. The mode of operation of the motor meter 1ᵇ shown in Fig. 3 is similar to that of the motor meter 1ª shown in Fig. 2.

An impulse-totalizing motor meter constructed in accordance with my invention operates more smoothly and efficiently than mechanical totalizers now being used. No supervising relays are necessary in my device. This elimination permits the use of an unlimited number of remote meter circuits with one totalizing meter.

My invention is equally efficient with a combination of counter-balance circuits and impulse-circuits, as with impulse circuits alone. By merely feeding the stationary winding 40 with the incoming current-balance currents, the device will operate to register the total of both the current-balance indications and the impulse indications. An auxiliary winding 60 in parallel with a number of remotely-located current-balance transmitters may also be utilized to actuate the rotor 30 for a similar purpose.

Heretofore, it has been impossible to combine the impulse system with the current-balance system by virtue of the dissimilarity of their electrical characteristics. However, with the aid of my invention, such systems may be made to operate the same totalizing device efficiently and accurately.

I claim as my invention:

1. In combination, a source of electrical energy, a motor meter having a rotor winding and a stator winding, one of said windings being in electrical circuit relation with the source, a condenser, and means including a commutator and a switch for charging and discharging the condenser from the source of electrical energy through the other winding.

2. In combination, a source of electrical energy, a motor-meter having a stator winding and a rotor winding, means including a commutator for keeping the rotor winding in electrical circuit relation with the source of electrical energy, a condenser, means including a double pole double throw switch in electrical circuit relation with the condenser, the stator winding and the source of electrical energy for charging and discharging the condenser through the stator winding from the source of electrical energy.

3. In a remote-metering system, means including a source of current for generating electrical impulses in a totalizing circuit at rates proportional to the load on a plurality of load circuit, and a totalizing motor meter having a field winding connected in said totalizing circuit adapted to be energized by said impulses and a rotatable armature for cooperating with said field winding, said armature being connected to said source.

4. In a remote-metering system, the combination with means including a source of current for generating electrical impulses in a totalizing circuit at rates proportional to the angular velocities of a plurality of rotating elements, of a totalizing device of the motor type having a field winding connected in said totalizing circuit to be energized by said impulses and a rotatable armature for cooperating with said field winding, the armature being connected to said current source.

5. A device for totalizing the operations of a plurality of metering devices in remote-metering systems of both the current-balance and impulse type comprising a motor meter having a field winding adapted to be energized by the impulses set up in the impulse system, a cooperating field winding energized by the current in the current-balance system, and a rotatable armature energized by a substantially constant current, for cooperating with both of said field windings.

6. A totalizing device for remote-metering systems comprising stationary field windings energized in proportion to the sum of the operations to be totalized, a rotatable armature energized by a current supplied by a variable voltage, and means for compensating for variations in the voltage of said source including braking means for retarding the rotation of said armature, and means whereby the effectiveness of said braking means is made proportional to the voltage of said source.

7. A totalizing device adapted to sum the operations of meters in remote-metering systems of the current-balance type in which the magnitude of a circulating current indicates the total load measured by the meters, and the impulse type in which the frequency of the transmitted impulses indicates the total load, comprising a motor meter having a plurality of field windings and a cooperating armature winding, one of said field windings being energized in proportion to the current circulating in the current-balance system, the other of said field windings being energized by the impulses in said impulse system, the armature winding being energized by a substantially constant current.

8. A totalizing device for remote-metering systems comprising a motor having a field winding energized by a series of impulses, the frequency of which is proportional to the load to be totalized, a rotatable armature winding connected to a variable-voltage current source, means for restraining the rotation of said armature including an induction disc and an electro-magnet for cooperation with said disc, said magnet being energized by said source.

In testimony whereof, I have hereunto subscribed my name this 26th day of April, 1927.

GRIFFIN G. WAITE.